(12) United States Patent
Hensler

(10) Patent No.: US 8,025,436 B2
(45) Date of Patent: Sep. 27, 2011

(54) WHISK

(76) Inventor: Harry Hensler, Ormond Beach, FL (US)

( * ) Notice: Subject to any disclaimer, the term of this patent is extended or adjusted under 35 U.S.C. 154(b) by 421 days.

(21) Appl. No.: 12/247,686

(22) Filed: Oct. 8, 2008

(65) Prior Publication Data

US 2009/0238030 A1 Sep. 24, 2009

Related U.S. Application Data

(60) Provisional application No. 61/037,836, filed on Mar. 19, 2008.

(51) Int. Cl.
*A47J 43/10* (2006.01)

(52) U.S. Cl. .......... 366/129; 15/141.2; 99/348; 366/343

(58) Field of Classification Search ............... 366/129, 366/343; 81/473, 477, 478; 99/348; 15/141.1, 15/14.21; 416/69, 70 R, 72, 75, 76, 136, 416/137, 173, 227 R, 230, 231 A
See application file for complete search history.

(56) References Cited

U.S. PATENT DOCUMENTS

| | | | | | |
|---|---|---|---|---|---|
| 55,802 A | * | 6/1866 | Ashley | ............. | 416/75 |
| 157,456 A | * | 12/1874 | Mackay | ............. | 416/75 |
| 401,058 A | * | 4/1889 | Pfau | ............. | 416/70 R |
| 449,187 A | * | 3/1891 | White | ............. | 366/276 |
| 529,764 A | * | 11/1894 | Weeks | ............. | 416/75 |
| 654,526 A | * | 7/1900 | Downing | ............. | 74/57 |
| 843,461 A | * | 2/1907 | Husser | ............. | 416/72 |
| 861,603 A | * | 7/1907 | Newton | ............. | 241/301 |
| 876,549 A | * | 1/1908 | Hoffman | ............. | 416/75 |
| 887,790 A | * | 5/1908 | Griswold | ............. | 30/123 |
| 938,369 A | * | 10/1909 | Christin | ............. | 416/75 |
| 1,010,019 A | * | 11/1911 | Christoph | ............. | 416/75 |
| 1,034,908 A | * | 8/1912 | Grant | ............. | 416/65 |
| 1,077,832 A | * | 11/1913 | Holt | ............. | 416/75 |
| 1,115,287 A | * | 10/1914 | Coughlin | ............. | 416/75 |
| 1,140,341 A | * | 5/1915 | Johnston et al. | ............. | 416/75 |
| 1,195,839 A | * | 8/1916 | Moses | ............. | 416/70 R |
| 1,210,192 A | * | 12/1916 | Moses | ............. | 416/70 R |
| 1,250,889 A | * | 12/1917 | Johnson | ............. | 416/75 |
| 1,268,586 A | * | 6/1918 | Lawton | ............. | 416/75 |
| 1,372,578 A | * | 3/1921 | Weber | ............. | 416/75 |
| 1,678,468 A | * | 7/1928 | Herron | ............. | 416/75 |
| 1,826,356 A | * | 10/1931 | Mahony | ............. | 416/75 |
| 1,960,089 A | * | 5/1934 | Rabb | ............. | 74/89.45 |
| 2,048,171 A | * | 7/1936 | Thompson | ............. | 474/146 |
| 2,111,407 A | * | 3/1938 | Rommel | ............. | 416/75 |
| 2,158,912 A | * | 5/1939 | Piperi | ............. | 416/75 |
| 2,208,337 A | * | 7/1940 | Maslow | ............. | 416/70 R |
| 2,278,398 A | * | 3/1942 | Wittmann | ............. | 366/343 |

(Continued)

*Primary Examiner* — Yogendra Gupta
*Assistant Examiner* — Sean S Luk
(74) *Attorney, Agent, or Firm* — Michael A. Blake

(57) ABSTRACT

A whisk comprising: a whisk handle, a bushing fixedly attached to the whisk head end of the whisk handle; at least two generally spiral grooves located on the interior surface; a bushing fixedly attached to whisk head end of the whisk handle; an extension member in rotatable and slideable communication with the whisk handle and the bushing, at least two engagement members extending orthogonally from the extension member and slideably engage with one of the grooves; a spring rod, with a whisk head end and a cap end, located within the extension member; an integral cap located on the cap end of the spring rod; a compression spring, in slideable communication with the spring rod, the whisk head end of the compression head pushing against the whisk head base, the cap end of the compression spring pushing against the integral cap.

8 Claims, 18 Drawing Sheets

U.S. PATENT DOCUMENTS

| | | | | |
|---|---|---|---|---|
| 2,546,285 A * | 3/1951 | Wittmann | | 366/276 |
| 2,575,978 A * | 11/1951 | Scheidecker | | 241/169.1 |
| 2,670,938 A * | 3/1954 | Wittmann | | 366/343 |
| 2,740,617 A * | 4/1956 | Ball et al. | | 416/75 |
| 2,922,628 A * | 1/1960 | Koe | | 366/129 |
| 3,063,685 A * | 11/1962 | Rommel | | 416/75 |
| 3,144,241 A * | 8/1964 | Harrison et al. | | 416/75 |
| 3,412,983 A * | 11/1968 | Kesilman et al. | | 416/70 R |
| 5,688,045 A * | 11/1997 | Butte | | 366/129 |
| 6,115,935 A * | 9/2000 | Collins et al. | | 34/58 |
| 6,206,561 B1 * | 3/2001 | Hefti | | 366/129 |
| 6,273,602 B1 * | 8/2001 | Steiner et al. | | 366/129 |
| 6,764,704 B2 * | 7/2004 | Schub | | 426/474 |
| 7,213,964 B2 * | 5/2007 | Holcomb et al. | | 366/129 |
| 7,740,397 B2 * | 6/2010 | Cheung | | 366/129 |
| 2005/0128864 A1 * | 6/2005 | Holcomb et al. | | 366/129 |
| 2007/0081415 A1 * | 4/2007 | Harewood | | 366/129 |
| 2008/0068921 A1 * | 3/2008 | Schanche | | 366/129 |
| 2008/0117712 A1 * | 5/2008 | Cheung | | 366/129 |

* cited by examiner

WHISK

CROSS-REFERENCES

This patent application claims the benefit of provisional patent application Ser. No. 61/037,836, by Jutta Baird, entitled "Whipper, Mixer & Whisk", filed on Mar. 19, 2008, the entire contents of which are fully incorporated by reference herein.

TECHNICAL FIELD

The present invention relates to a handheld kitchen device, in particular, to a hand powered device for use in mixing and whisking various foods.

BACKGROUND

Conventional mixing and whisking devices are in widespread use in many households, and commercial enterprises. For example, in households, these devices are often used in the kitchen for mixing and whisking foods such as eggs, batter for baked foods, puddings, shakes for drinking, and other wet viscous and/or dry foods. These devices include both hand powered as well as electric and battery powered devices and come in various sizes. Hand powered devices include the traditional whisk that is used by rapidly rotating the device within the food that is placed into a bowl or similar vessel.

The process of manually mixing, beating, or stirring a food substance can be a tiring job. The basic whisk having a handle and a series of looped wires attached thereto requires a substantial amount of rotational energy supplied to the handle in order to achieve a sufficient amount of whipping motion and velocity/energy at the whisk-head. When attempting to mix relatively viscous food items or when required to mix for a given amount of time to achieve a desired consistency, the basic whisk, regardless of the whisk-head configuration, requires a substantial amount of input energy from the user.

Therefore there is a need for a whisk that overcomes the above described and other disadvantages.

SUMMARY

The disclosed invention relates to a whisk comprising: a whisk handle comprising an interior surface, an exterior surface, a whisk head end, and a cap end; a bushing fixedly attached to the whisk head end of the whisk handle; at least two generally spiral grooves located on the interior surface; a bushing fixedly attached to whisk head end of the whisk handle; an extension member in rotatable and slideable communication with the whisk handle and the bushing, the extension member having a whisk head end and a cap end; at least two engagement members extending orthogonally from the extension member, the at least two engagement members located at the cap end of the extension member, and wherein each of the at least two engagement members slideably engage with one of the generally spiral grooves; a whisk head, with a whisk head base, the whisk head based fixedly attached to the whisk head end of the extension member, and generally externally located with respect to the whisk handle; a spring rod, with a whisk head end and a cap end, located within the extension member; an integral cap located on the cap end of the spring rod, the integral cap externally located with respect to the extension member; a compression spring, with a whisk head end and a cap end, in slideable communication with the spring rod, the whisk head end of the compression head pushing against the whisk head base, the cap end of the compression spring pushing against the integral cap; and a handle cap removeably attached to the cap end of the handle, the handle cap containing the integral cap.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
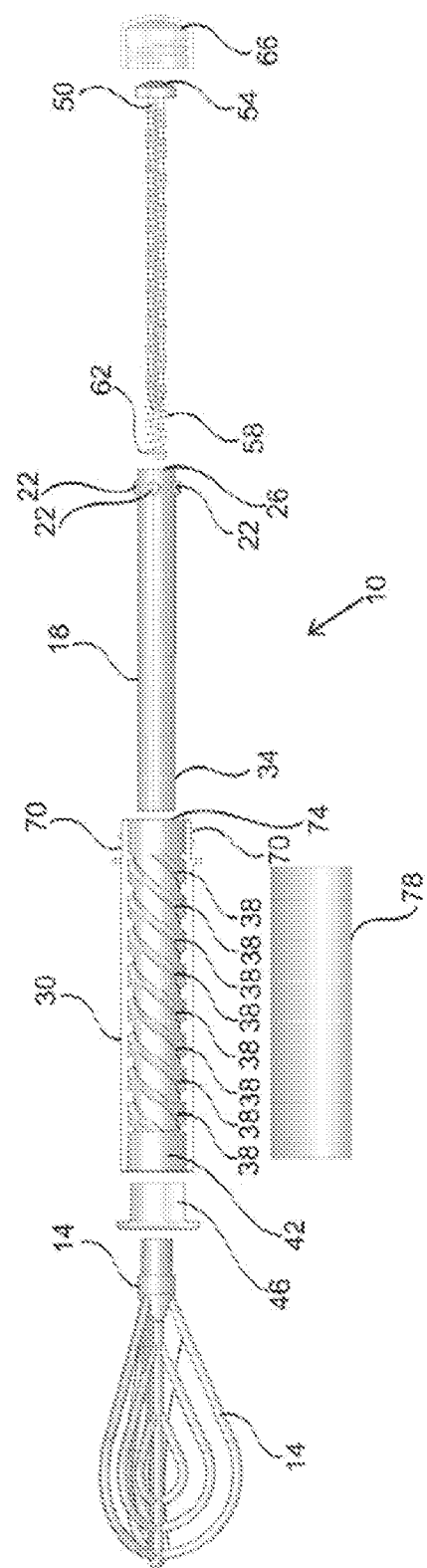
FIG. 1 shows an exploded view of the disclosed whisk.
Figure 2:
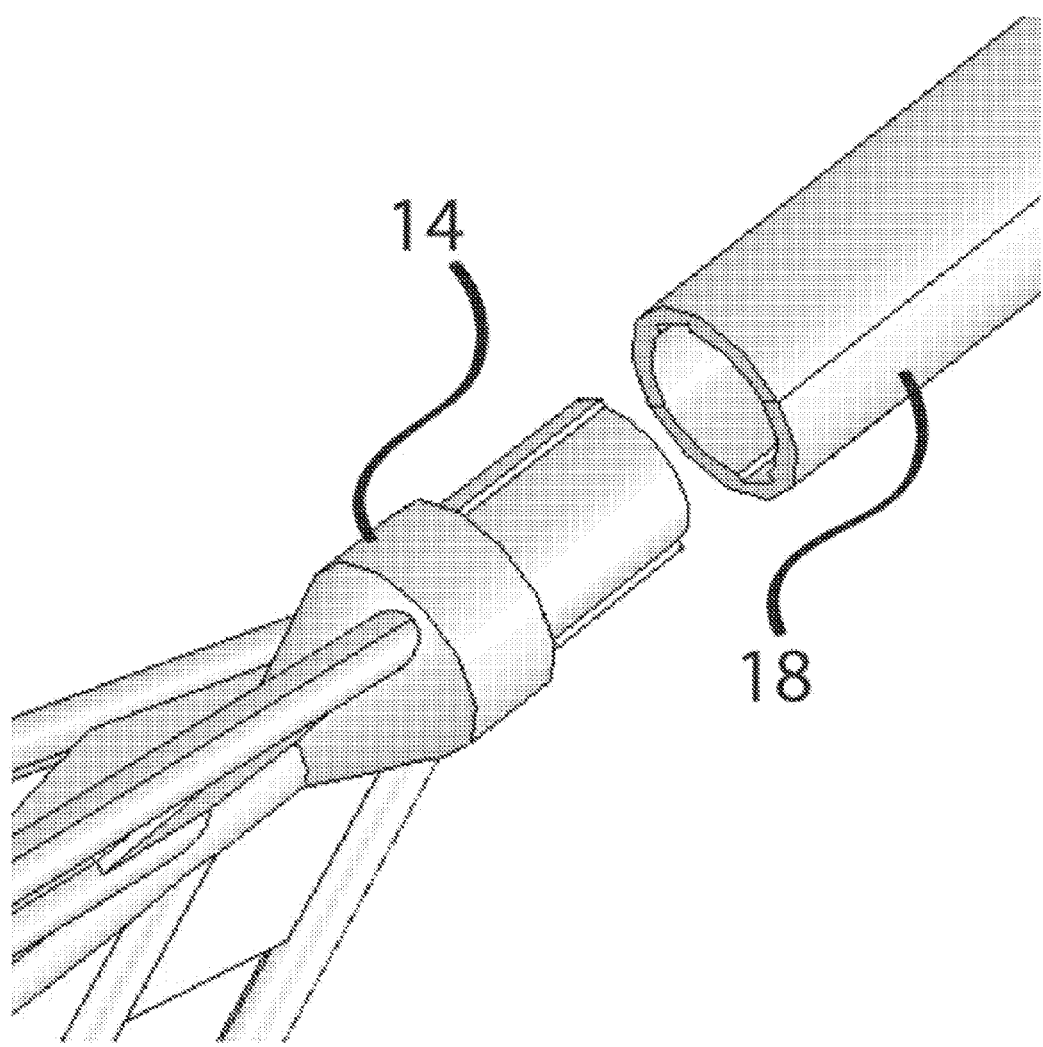
FIG. 2 shows a close up perspective view of the extension member and whisk head.
Figure 3:
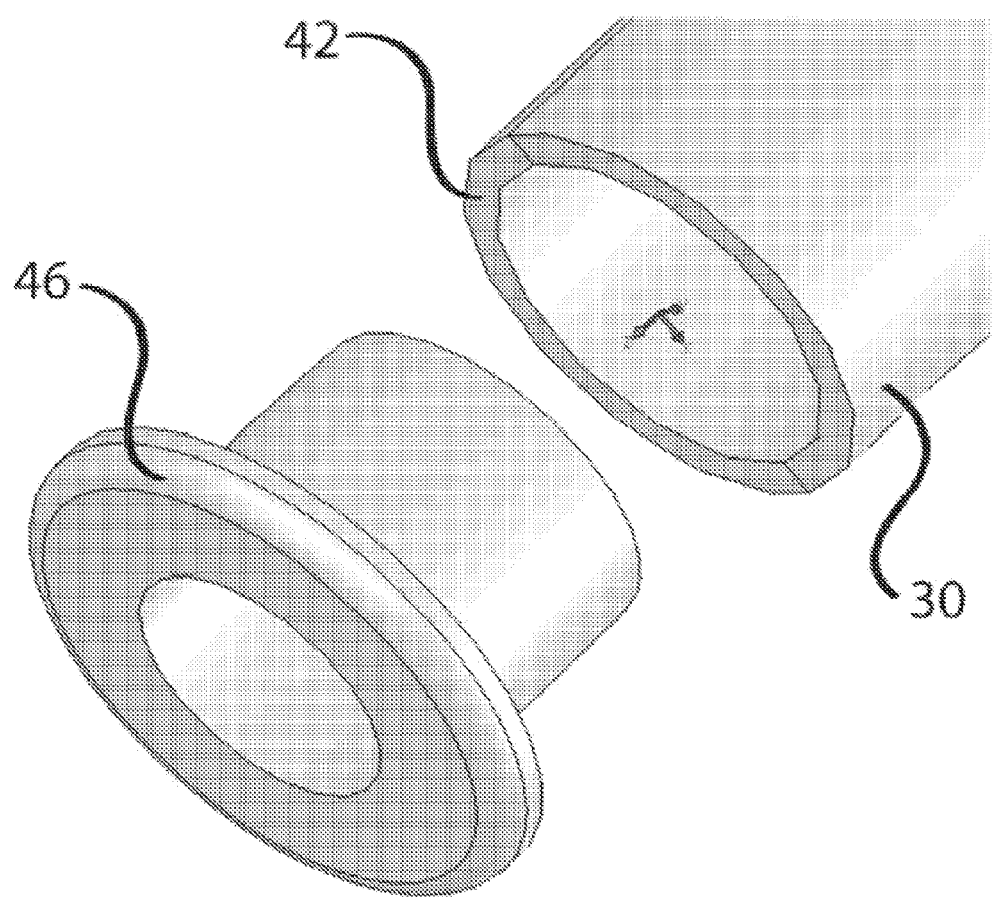
FIG. 3 shows a perspective view of the bushing and handle.

FIG. 1 shows an exploded view of the disclosed whisk 10. The disclosed whisk comprises a whisk head 14. The whisk head is configured to attach to the extension member 18. The extension member 18 has a plurality of engagement members 22 extending orthogonally from the extension member 18 and located at a cap end 26 of the extension member 18 (the other end of the extension member 18 being the whisk head end 34). The extension member 18 is configured to slideably rotate within a whisk handle 30. The interior surface of the whisk handle 30 has a plurality of generally spiral shaped grooves 38. The grooves 38 are cut into the interior surface of the handle 30 in order to accept the engagements members 22. Please note, the grooves 38 are on the interior surface of the handle 30, and not on the exterior surface. The handle 30 at its whisk head end 42, attaches to a bushing 46. The whisk head 14 and extension member 18 can rotate within the bushing 46. A spring rod 50 has an integral cap 54. A compression spring 58 envelopes the spring rod, and is able to push against the integral cap 54. The whisk head end 62 of the spring 58 is configured to push against the whisk head 14. A handle cap 66 is removeably attachable to the cap end 74 of the handle 30. In one embodiment, the handle cap may have internal threads configured to thread onto threads 70 located at the cap end 74 of the handle 30. An optional grip 78 may be slipped onto the handle 30. The optional grip 78 may be made out of a soft or cushioned material, such as but not limited to: rubber; soft plastic; foam rubber, and leather. FIG. 2 shows a close up perspective view of how the extension member 18 fits into the whisk head 14. FIG. 3 shows a close-up perspective view of how the bushing 46 fits in the handle 30.

Figure 4:
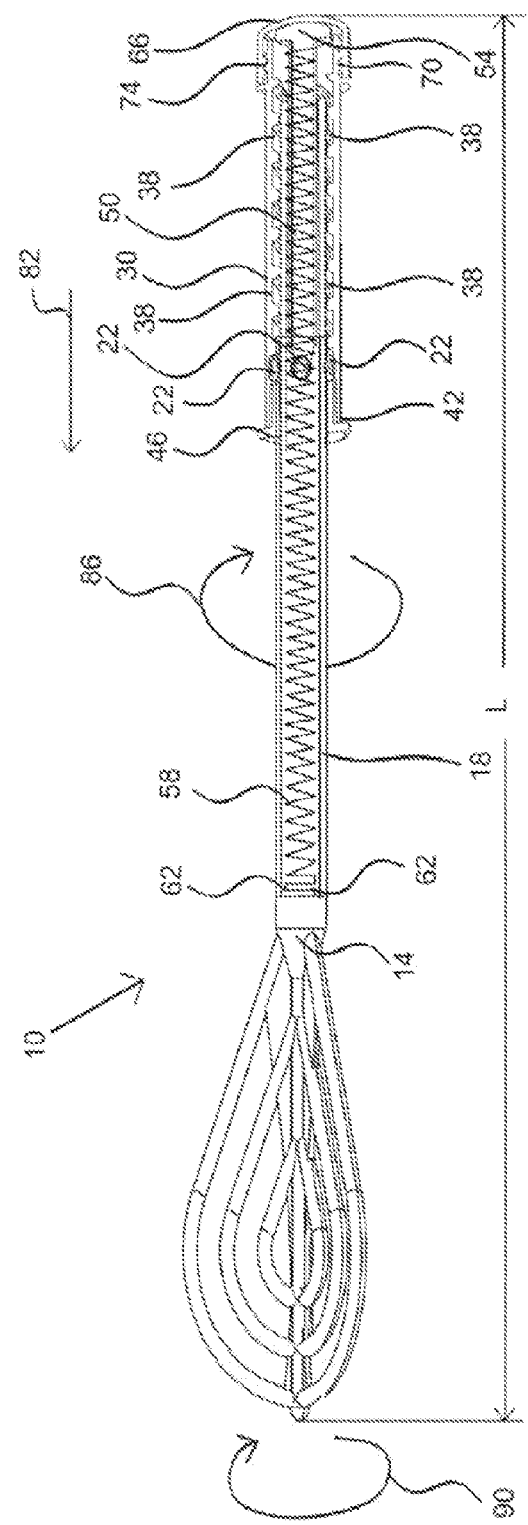
FIG. 4 shows a sectional view of the whisk in an extended state.
Figure 5:
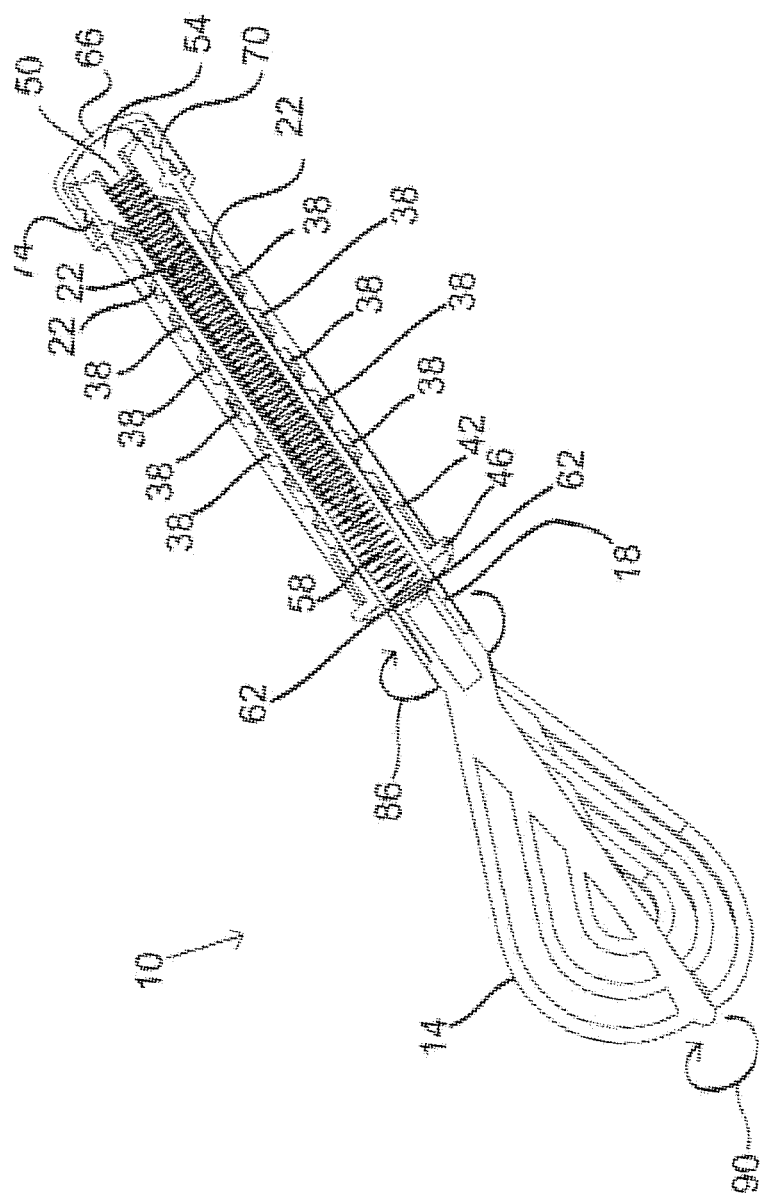
FIG. 5 shows a sectional view of the whisk in a compressed state.

FIG. 4 shows a sectional view through a centerline through the whisk 10, when the whisk 10 is in an extended state. The engagement members 22 are shown engaged with the grooves 38. The spring 58 tends to push the handle 30 away from the whisk head 14. The handle cap 66 holds the spring rod 50 and spring 58 within the handle 30 (the spring 58 is also within the extension member 18). In order to compress the spring 58, the handle 30 must move relative to the whisk head in the direction shown by the arrow 82. This may be done by holding the whisk 10 by the handle 30, with the whisk head 14 against the interior of a container, such as, but not limited to a bowl. While thus holding the whisk 10, the user pushes the handle towards the interior of the container, thereby compressing the handle 30 with respect to the whisk head 14. As the handle 30 moves towards the whish head 14, the extension member 18 moves up the interior of the handle 30 (towards the cap end 74 of the handle 30). As the extension member 18 moves up the interior of the handle 30, the extension member 18 (and the whisk head 14 it is attached to) rotates due to the traveling of the engagement members 22 within the grooves 38. The arrows 86 and 90 show how the extension member 18 and whisk head 14 may rotate during the compression of the spring 58. In FIG. 4, the engagement members 22 are shown in the grooves 38 near the whisk head end 42 of the handle 30. FIG. 5 shows a sectional view through a centerline through the whisk 10, when the whisk 10 is in a compressed state. In this view, the engagement members 22 are shown in the grooves 38 near the cap end 74 of the handle 30. When the whisk 10 is allowed to go from a compressed state to an extended state, the rotation of the whisk head 14 and extension member 18 will be opposite to the rotation of the whisk head 14 and extension member 18 when it went from an extended state to a compressed state. It should also be noted that dependent on the configuration of the grooves, the whisk head 14 may rotate counter-clockwise or clockwise when the handle 30 is compressed with respect to the whisk head 14. The length L of the whisk in an extended state may be any length. However, a length L of about 13 inches may be preferable for one embodiment of the disclosed whisk 10.

Figure 6:
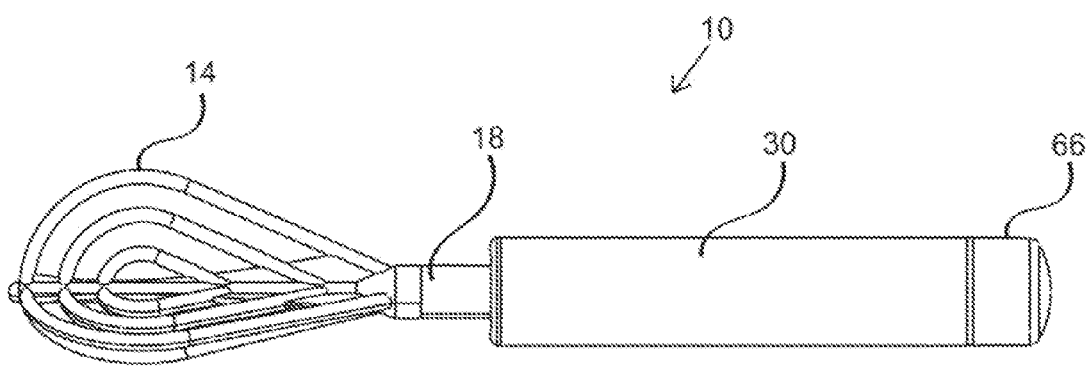
FIG. 6 shows a side view of the disclosed whisk 10 in a compressed state.

FIGS. 6 shows a side view of the disclosed whisk 10 in a compressed state.

Figure 7:
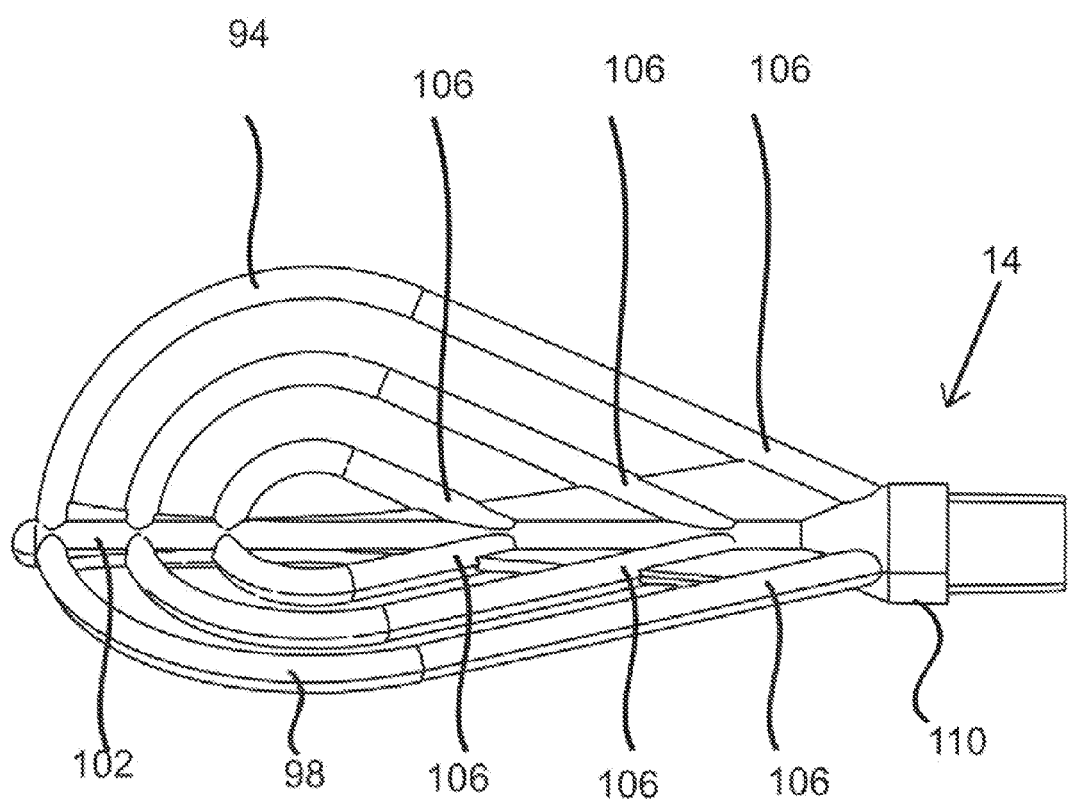
FIG. 7 shows a side view of the whisk head.

FIG. 7 shows a close up side view of the whisk head 14. The whisk head 14 comprises three wings, two of which are clearly visible, wings 94 and 98. The third wing is not visible in this view, as it is behind wing 98. The whisk head comprises a central member 102. Each wing comprises a plurality of curved whisk members 106 attached either to the central member 102 or to the whisk head base 110.

Figure 8:
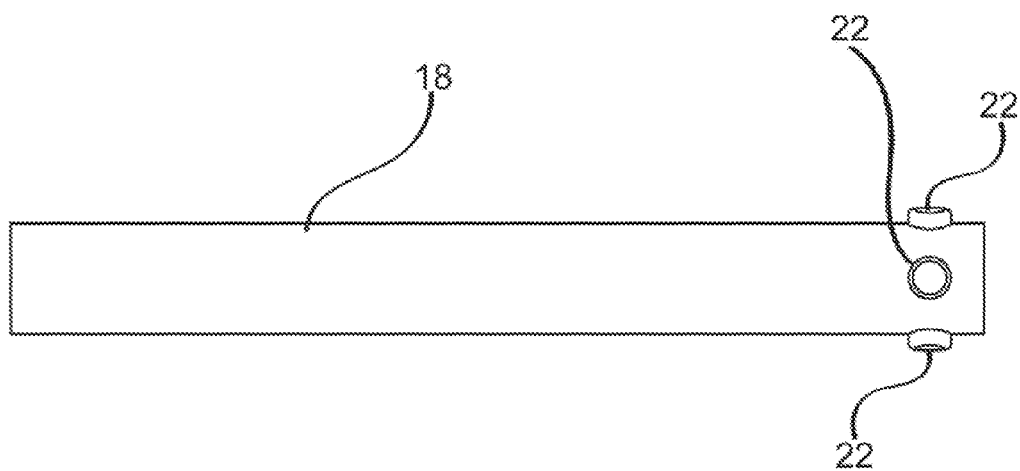
FIG. 8 shows a side view of the extension member.

FIG. 8 shows a side view of the extension member 18. Three of the engagement members 22 are visible in this view.

Figure 9:
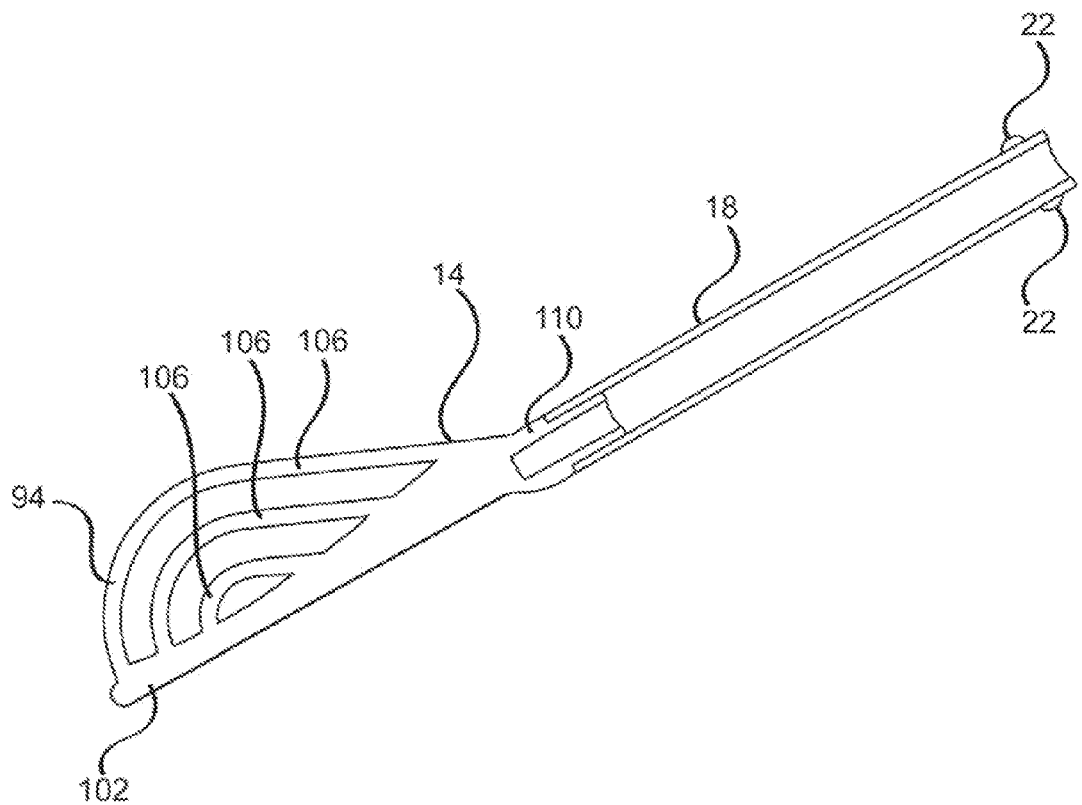
FIG. 9 shows a cross-sectional view of the extension member attached to the whisk head.

FIG. 9 shows a cross-sectional view of the extension member 18 attached to the whisk head 14. In this view, only one 94 of the three wings of the whisk head are visible.

Figure 10:
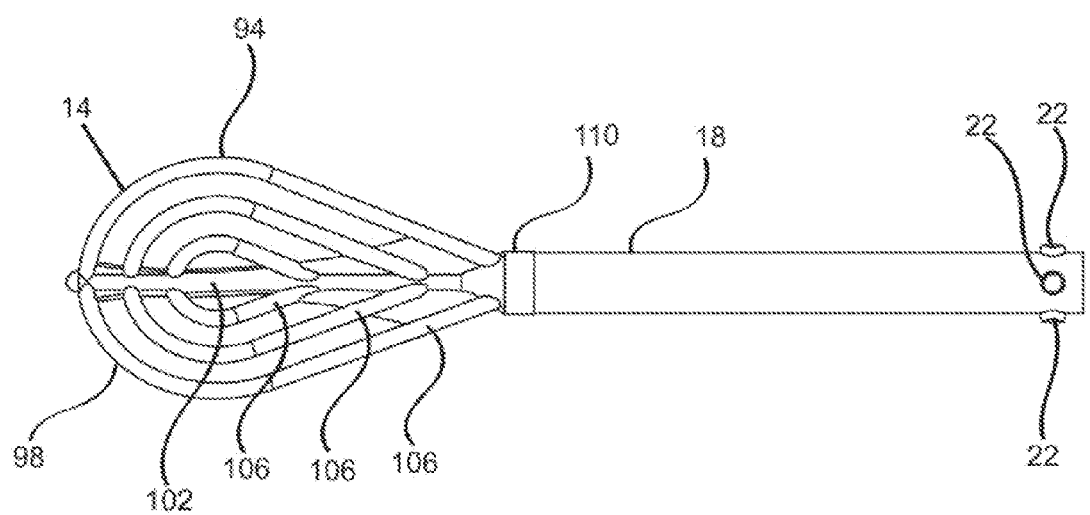
FIG. 10 shows a side view of the extension member attached to the whisk head.

FIG. 10 shows a side view of the extension member 18 attached to the whisk head. In this view two 94, 98 of the three wings of the whisk head 14 are visible.

Figure 11:
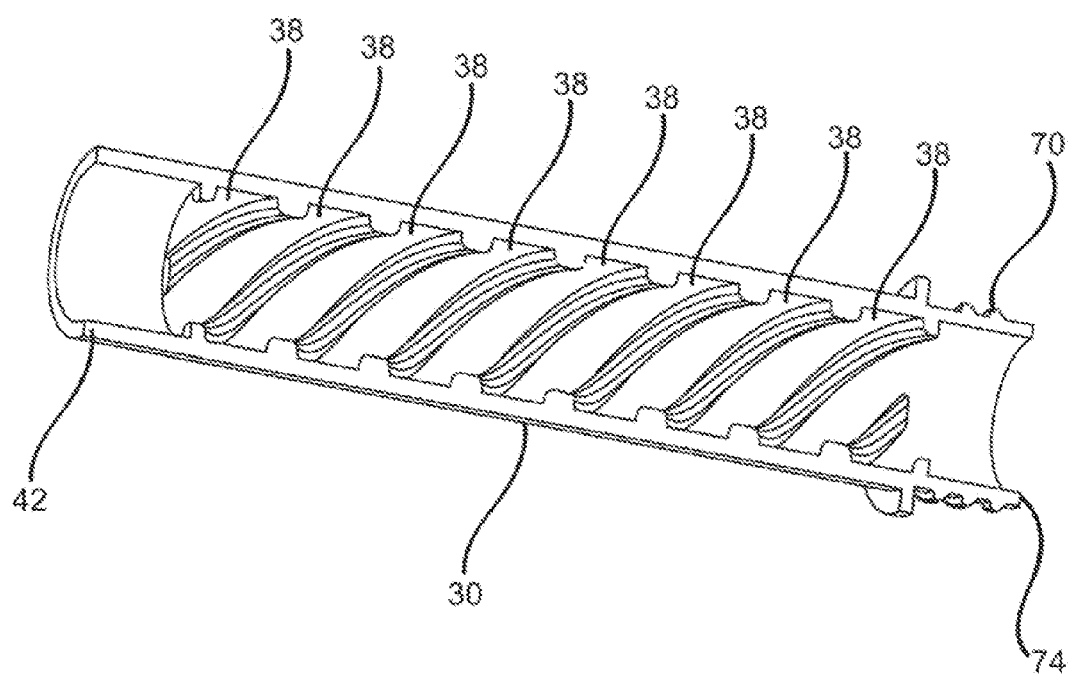
FIG. 11 shows a cross-sectional view of the handle.

FIG. 11 shows a cross-sectional view of the handle 30.

Figure 12:
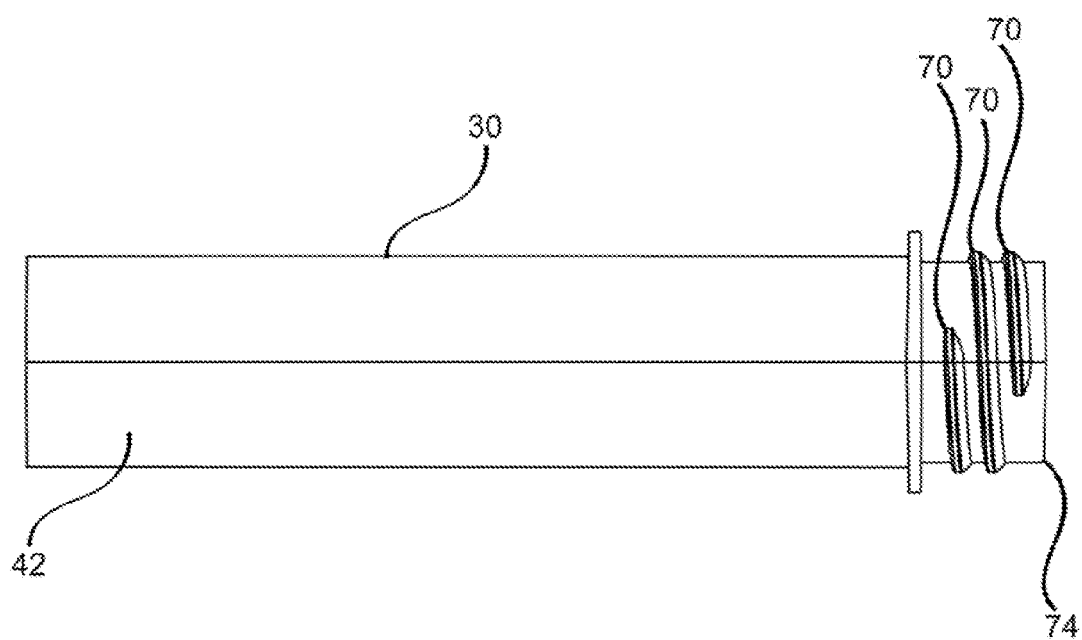
FIG. 12 shows a side view of the handle.

FIG. 12 shows a side view of the handle 30.

Figure 13:
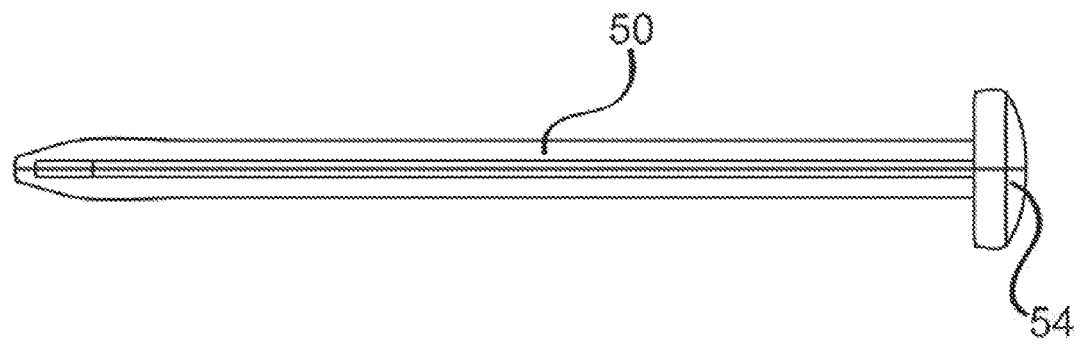
FIG. 13 shows a side view of the spring rod.

FIG. 13 shows a side view of the spring rod 50.

Figure 14:
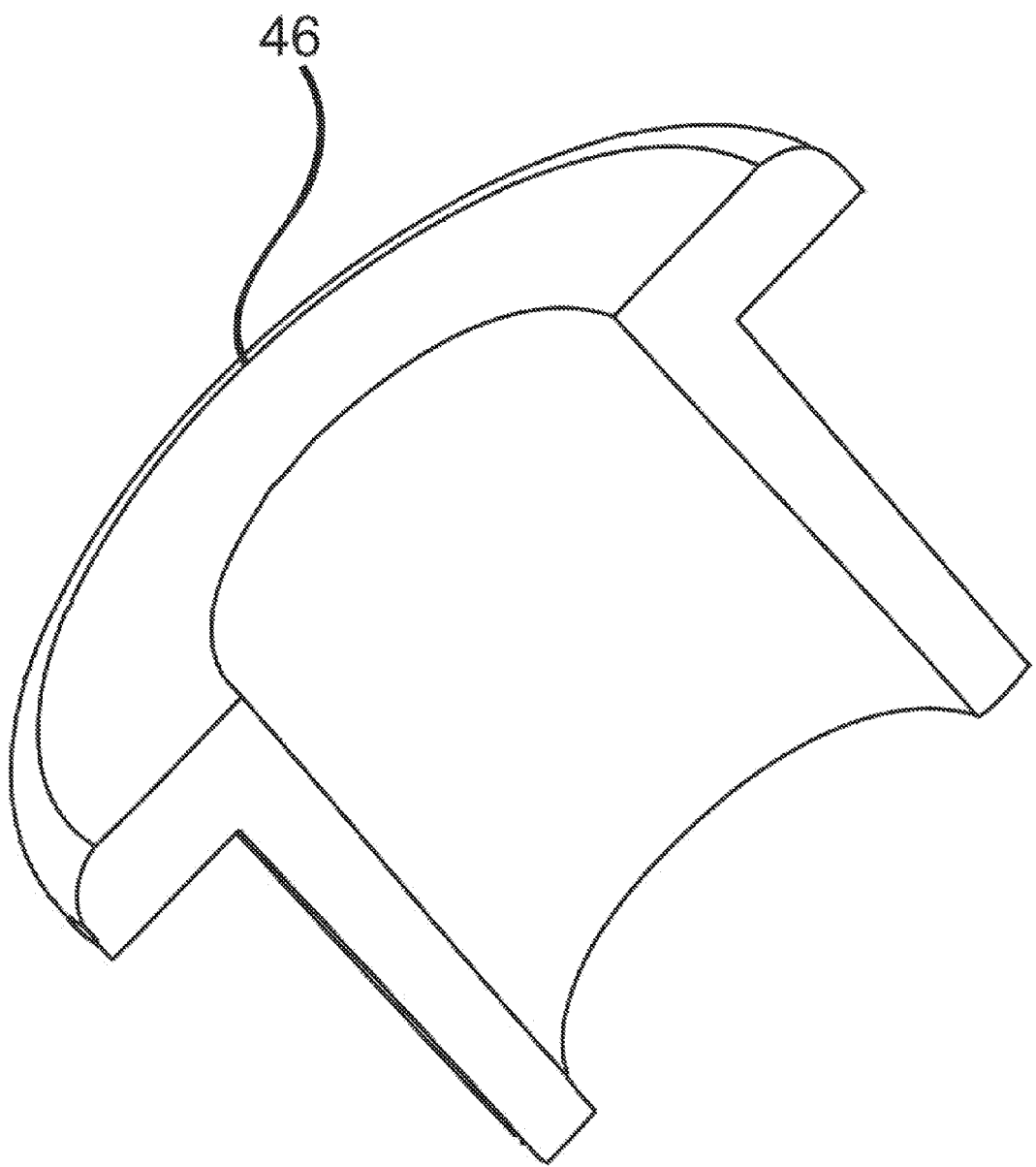
FIG. 14 shows a cross-sectional perspective view of the bushing.

FIG. 14 shows a cross-sectional perspective view of the bushing 46.

Figure 15:
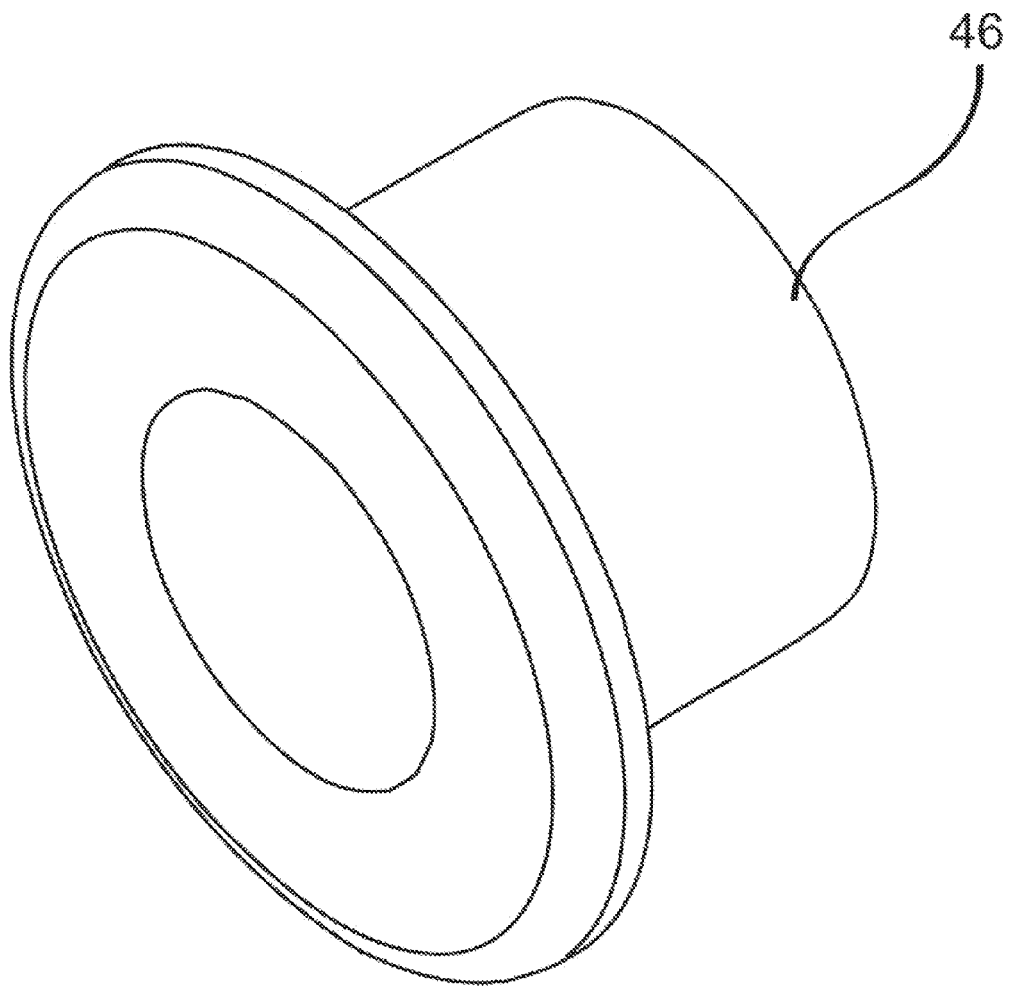
FIG. 15 shows a perspective view of the bushing.

FIG. 15 shows a perspective view of the bushing 46.

Figure 16:
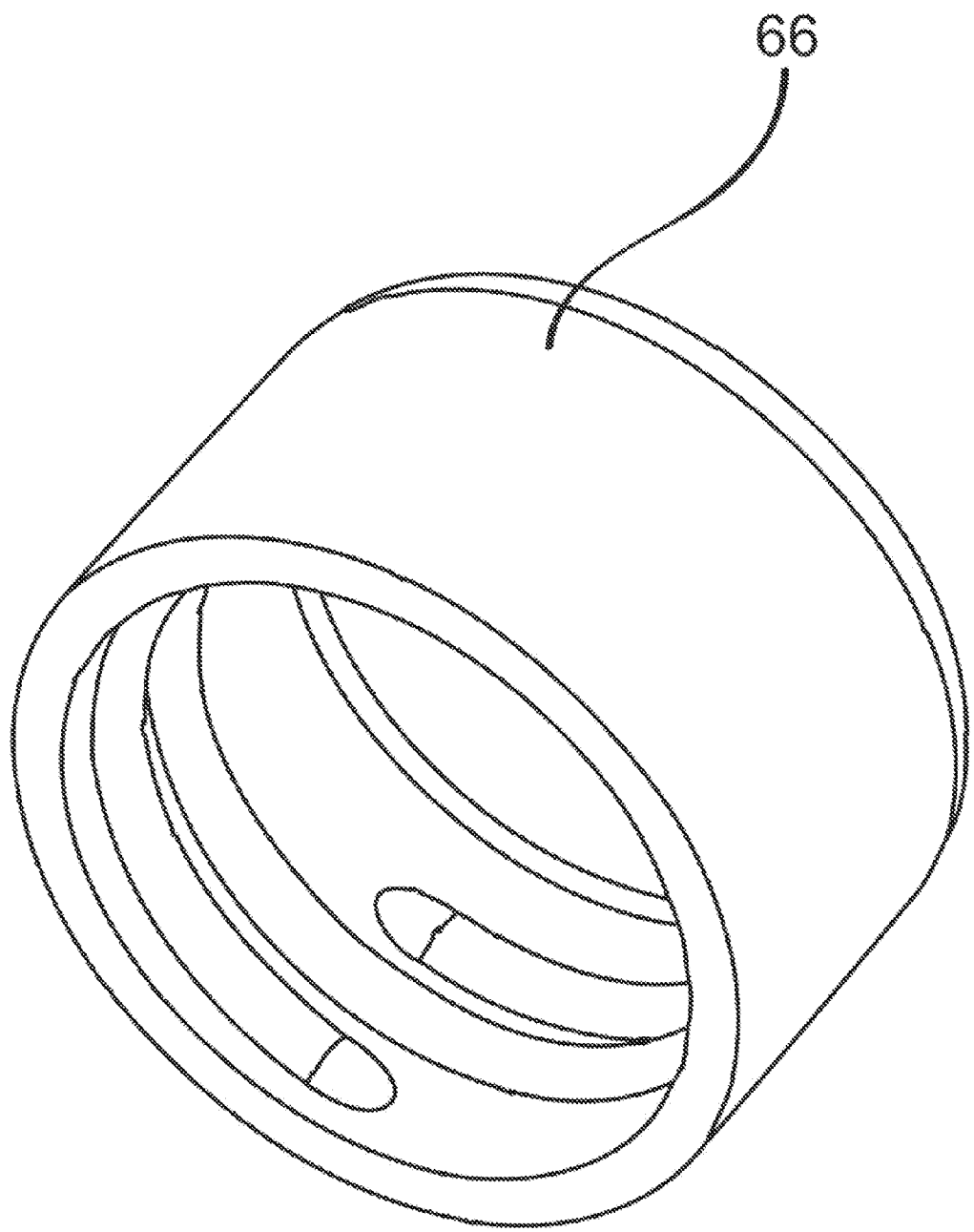
FIG. 16 shows a perspective view of the handle cap.

FIG. 16 shows a perspective view of the handle cap 66.

Figure 17:
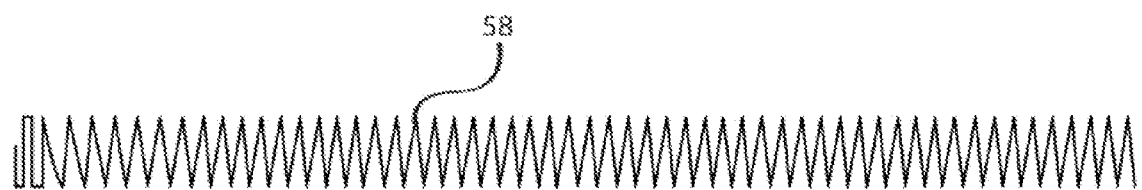
FIG. 17 shows a side view of the compression spring.

FIG. 17 shows a side view of the compression spring 58.

Figure 18:
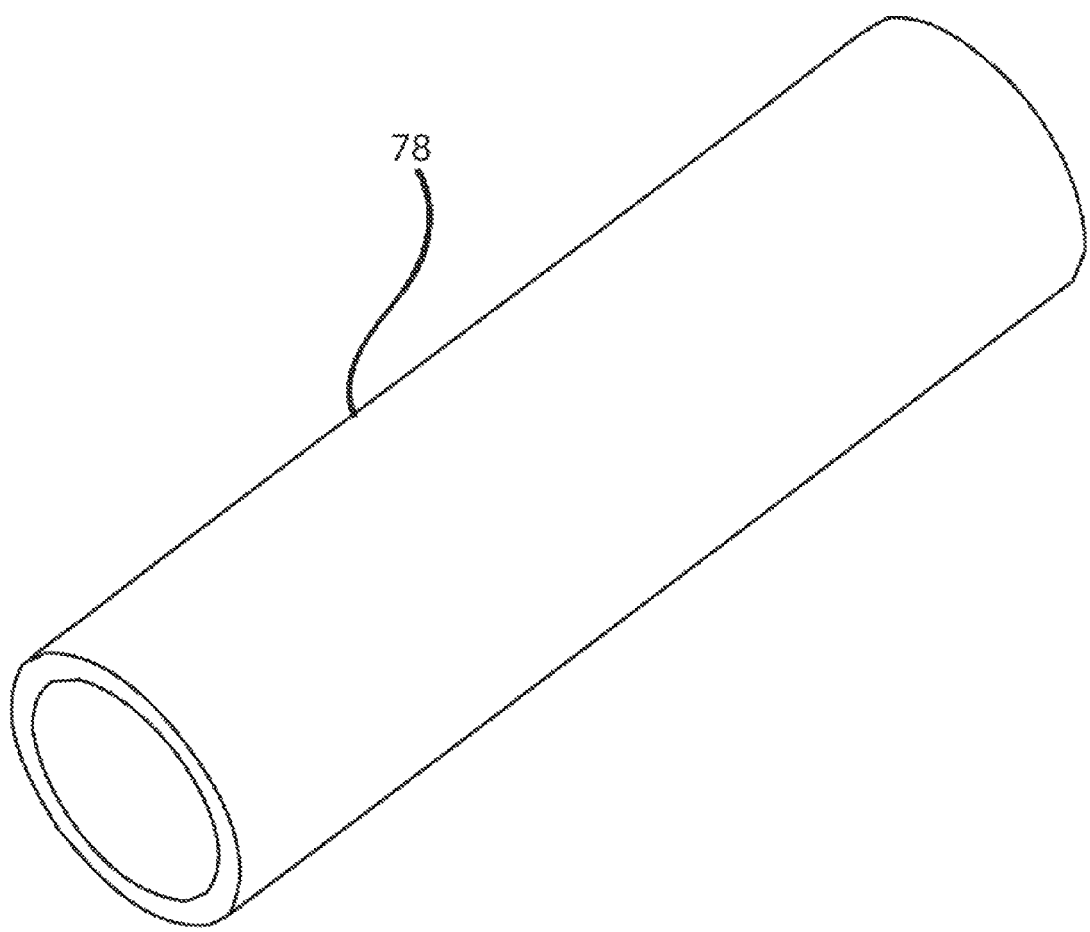
FIG. 18 shows a perspective view of the optional grip.

FIG. 18 shows a perspective view of the optional grip 78.

The disclosed whisk may be made out of any suitable material including plastic and/or metal.

The disclosed invention has many advantages. The disclosed whisk can mix foods, much like a powerful electric mixer, but is generally only the size of a whisk. The disclosed whisk is a green product, in that it does not require electricity. Due to its size, the whisk is easy to clean, store, and use.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A whisk comprising:
   a whisk handle comprising an interior surface, an exterior surface, a whisk head end, and a cap end;
   a bushing fixedly attached to the whisk head end of the whisk handle;
   at least two generally spiral grooves located on the interior surface;
   a bushing fixedly attached to whisk head end of the whisk handle;
   an extension member in rotatable and slideable communication with the whisk handle and the bushing, the extension member having a whisk head end and a cap end;
   at least two engagement members extending orthogonally from the extension member, the at least two engagement members located at the cap end of the extension member, and wherein each of the at least two engagement members slideably engage with one of the generally spiral grooves;
   a whisk head, with a whisk head base, the whisk head based fixedly attached to the whisk head end of the extension member; and generally externally located with respect to the whisk handle;
   a spring rod, with a whisk head end and a cap end, located within the extension member;
   an integral cap located on the cap end of the spring rod, the integral cap externally located with respect to the extension member;
   a compression spring, with a whisk head end and a cap end, in slideable communication with the spring rod, the whisk head end of the compression head pushing against the whisk head base, the cap end of the compression spring pushing against the integral cap; and
   a handle cap removeably attached to the cap end of the handle, the handle cap containing the integral cap.

2. The whisk of claim 1, further comprising:
   a whisk handle thread located at the cap end of the whisk handle;
   an internal thread located in the handle cap; and
   wherein the handle cap is configured to thread onto the whisk handle thread.

3. The whisk of claim 1, wherein the whisk head further comprises:

a central member extending from the whisk head base;
a first plurality of curved whisk members attached to the central member and a component selected from the group consisting of the central member and whisk head base;
wherein the first plurality of curved whisk members forms a first wing of the whisk;
a second plurality of curved whisk members attached to the central member and a component selected from the group consisting of the central member and whisk head base;
wherein the second plurality of curved whisk members forms a second wing of the whisk;
a third plurality of curved whisk members attached to the central member and a component selected from the group consisting of the central member and whisk head base;
wherein the third plurality of curved whisk members forms a third wing of the whisk; and
wherein none of the three wings intersect with any of the other wings.

4. The whisk of claim 1, further comprising:
a grip attached to the exterior surface of the whisk handle.

5. The whisk of claim 4, wherein the grip is made out of a material selected from the group consisting of rubber, soft plastic, foam rubber, and leather.

6. The whisk of claim 1, wherein the length of the whisk in an extended state is about 13 inches.

7. The whisk of claim 1, wherein the whisk, is made out of a material selected from the group consisting of plastic and steel.

8. The whisk of claim 1, wherein the whisk, except for the spring, is made out of a material selected from the group consisting of plastic and steel.

* * * * *